United States Patent [19]
Brandt

[11] 4,014,218
[45] Mar. 29, 1977

[54] APPARATUS FOR TRANSMISSION-THROTTLE CONTROL

[75] Inventor: Vernon Brandt, Reedley, Calif.

[73] Assignee: Brandt Manufacturing Co., Reedley, Calif.

[22] Filed: June 30, 1975

[21] Appl. No.: 591,714

[52] U.S. Cl. .................................. 74/474; 74/478; 74/480 R; 74/513; 192/.098

[51] Int. Cl.² ................. G05G 13/00; G05G 9/08; G05G 11/00

[58] Field of Search ......................... 192/.096, .098; 74/471 R, 474, 480 R, 480 B, 512, 513

[56] References Cited
UNITED STATES PATENTS

| | | | |
|---|---|---|---|
| 3,228,504 | 1/1966 | Funk | 192/.098 |
| 3,691,863 | 9/1972 | Shaffer | 192/.098 |

*Primary Examiner*—Allan D. Herrmann
*Attorney, Agent, or Firm*—Lyon & Lyon

[57] ABSTRACT

A apparatus for the control of a transmission and throttle of a forklift or the like to provide simultaneous control of a transmission position and the throttle position.

The apparatus includes a reciprocally and rotatably moveable control rod and a transmission control lever oppositely reciprocable from a neutral position to forward and reverse displacement positions, coupled to and responsive to the movement of the control rod in first and second translational passageways. A throttle control lever is also coupled to and responsive to the movement of the control rod for controlling the throttle responsive to movement of the control rod in the first and second translational passageways and in a third translational passageway. The third translational passageway is defined by first and second wall members which are substantially parallel. The first and second passageways are formed by the first wall member and a fourth wall member and the second wall member and a third wall member respectively. Forward and reverse footpedals are coupled to the control rod by linkage means whereby actuation of the forward footpedal causes the control rod to move along the first passageway thereby opening the throttle and positioning the transmission in the forward position, actuation of the reverse footpedal causes the control rod to move along the second passageway thereby opening the throttle and positioning the transmission in the reverse position, actuation of both the forward and reverse footpedals causes the control rod to open the throttle while leaving the transmission in the neutral position.

6 Claims, 2 Drawing Figures

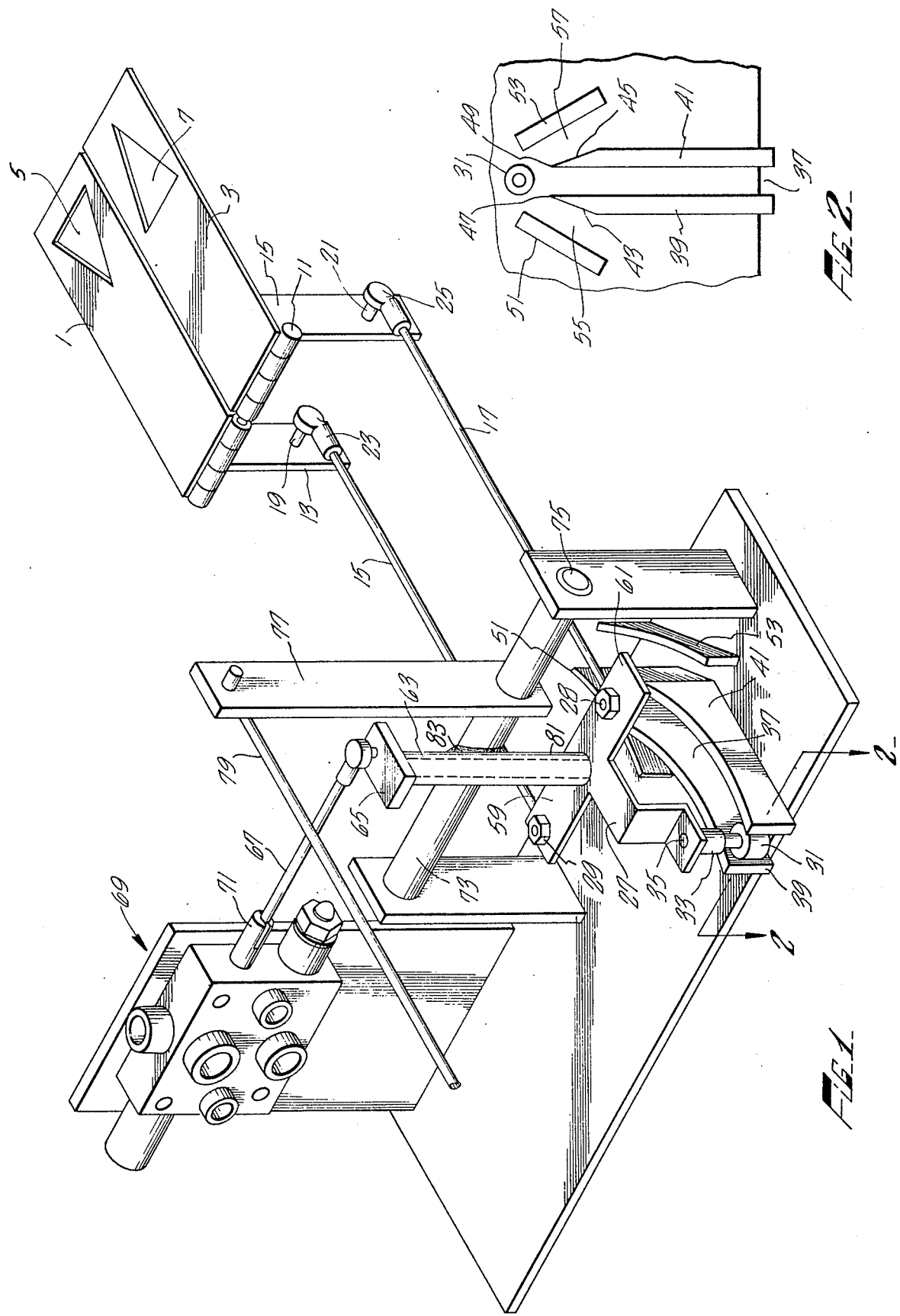

APPARATUS FOR TRANSMISSION-THROTTLE CONTROL

BACKGROUND OF THE INVENTION

A forklift or the like is typically utilized for the lifting and relocating of various items to be moved. Such an operation entails frequent transmission changes from the forward to reverse positions and back again. Additionally, it is sometimes necessary to increase the engine speed in order to pickup an article while the transmission is in the neutral position prior to being engaged in either the forward or reverse mode. Prior systems have utilized a separate system for increasing the throttle opening which is separate and apart from the transmission control arrangement. Such arrangements are expensive, both in initial cost and maintenance costs, and require additional space. Furthermore, when the throttle opening system may be operated separately from the transmission control, the transmission may be damaged by engaging in the transmission in the forward or rearward position at a high throttle opening such as to cause the forklift to "jerk" or "jump".

An object of this invention is to provide an apparatus for controlling the throttle and transmission of a forklift or the like. Other additional objectives will become apparent upon reading of the entire specification, drawing and claims.

SUMMARY OF THE INVENTION

In accordance with this invention, an apparatus for the controlling of the transmission-throttle for a forklift or similar device is provided. A reciprocally and rotatably moveable control rod is coupled to a transmission control lever and a throttle control lever. The transmission control lever is oppositely reciprocatable from a neutral position to forward and reverse displacement positions responsive to the movement of the control rod in first and second translational passageways. The throttle control lever is oppositely reciprocatable to open and close a throttle responsive to the movement of the control rod in the first and second translational passageways and in a third translational passageway. When the control rod is moved in the third translational passageway the transmission control lever is uneffected and remains in the neutral position.

Linkage means are provided which couple first and second control means to the control rod such that actuation of the first control means causes the control rod to move along the first passageway thereby simultaneously increasing the throttle opening and moving the transmissional control lever from a neutral to forward displacement mode or position. Actuation of the second control means causes the control rod to move along the second passageway thereby simultaneously opening the throttle and moving the transmission control lever from a neutral to a reverse displacement mode or position. Actuation of both the first and second control means causes the control rod to move along a third passageway thereby opening the throttle without moving the transmission lever from the neutral mode or position.

The third translational passageway is designed by first and second wall members, the first passageway is defined by the first wall member and a fourth wall member, and the second passageway is defined by the second wall member and a third wall member. The three passageways are adjacent the control rod and adapted to allow the control rod to traverse any of the three passageways dependent upon the actuation of either the first or second control means or both the first and second control means. In a preferred embodiment the control rod is provided with roller member adapted to roll along the walls defining the passageways, and the first and second passageways are positioned between about 30° and 45° on either side of the centerline of the first and second wall members.

BRIEF DESCRIPTION OF THE DRAWINGS

FIG. 1 is a pictorial view of a transmission and throttle control apparatus in accordance with the present invention.

FIG. 2 is a cross-sectional view taken along line 2—2 of FIG. 1.

DESCRIPTIONS OF PREFERRED EMBODIMENTS

Referring now to FIG. 1, the transmission and throttle control apparatus in accordance with the present invention will be seen to include a first control means 1 and a second control means 3.

In a preferred embodiment, the first and second control means 1 and 3, are footpedals which may have directional indicators placed or cut thereon such as the triangular cutouts 5 and 7. It is noted that triangular cutout 5 is directed in the forward direction cutout 7 is directed in the rearward direction. The control footpedal 1 and control footpedal 3 may pivot about hinge point 11. Control pedal 1 may have a plate 13 rigidly attached thereto; similarly, control pedal 3 may have a plate 15 connected thereto. Rod members 15 and 17 may be connected to the plates 13 and 15 by pins 19 and 21 which protrude from the plates 13 and 15 respectively and connective socket members 23 and 25. Rods 15 and 17 may be attached to control rod bracket 27 by suitable means such as pivotal attachment assemblies 28 and 29 respectively. A roller member 31 may be attached to the control rod bracket 27 by means of rod 33 which may be welded or otherwise connected to the bracket assembly 27 at a portion 35.

When the control pedals 1 or 3 are depressed it may be seen from the foregoing language that the plates 13 and 15 respectively are rotated outwardly thereby forcing the control rod bracket member 27 in a generally forward direction through the forces transmitted by rods 15 and 17. As shown in FIG. 1 both pedals 1 and 3 have been depressed thereby forcing control rod bracket member 27 and roller member 31 in a forward direction within a translational passageway 37 defined by wall members 39 and 41. In a preferred embodiment wall members 39 and 41 are in substantially parallel relationship and the forward end portions of wall members 39 and 41, 43 and 45 respectively, are tapered to a point 47 and 49 respectively. A third wall member 51 may be positioned at one side of the wall members 39 and 41, and a fourth wall member 53 is placed at the opposite side. In a preferred embodiment, the third and fourth wall members are positioned between about 30° and 45° from the centerline of the substantially parallel first and second wall members 39 and 41.

A first passageway 57 may be formed between the fourth wall member 53 and the first wall member 41; similarly, a second passageway 55 may be defined between the third wall member 51 and the second wall member 39.

As may be seen more clearly in FIG. 2, when the first and second control means 1 and 3 are in the unactuated state, the control rod roller member 31 is in the neutral position. When only the first control means 1 is actuated or depressed, the control rod roller member 31 is forced along the first translational passageway 57. This is due to the fact that when only the first control means 1 is actuated, the control rod bracket member 27 pivots in a counterclock-wise motion as viewed from the top about point 28 thereby allowing the control rod roller member to traverse along the first translational passageway 57. This rotation is due to the fact that depression of the first control means 1 rotates the plate 13 outwardly thereby causing the rod 15 to move forwardly and forcing a first control rod bracket member plate 59 to rotate about point 28. Similarly, when only control means 3 is depressed, plate 15 pivots outwardly about pivot 11 thereby forcing rod member 17 in a forward direction and forcing second leg member 61 of the control rod bracket 27 in a forward direction allowing the control rod bracket to pivot about point 29 and also move forward due to the forward force of rod 17. The forward forces of rod 15 and 17 acting upon the bracket member 27 allow the entire bracket member 27 to move forward to a certain extent, thus when only control means 1 is depressed and rod 15 is moved forward, due to the forward motion of the bracket member 27, rod member 17 is also pulled forward to a certain extent, and the second control means 3 may be depressed somewhat.

A swingable and rotatably moveable control rod 63 may be mounted atop the control rod bracket 27. Control rod 63 is rotatably mounted in a tube 81 so that the control rod 63 may swing in a plane which is perpendicular to pivot axis 75. The tube 81 may be secured to member 73 by means of a weld 83. The plate member 65 may be positioned at the top of control rod member 63 and a control linkage 67 is extended from the plate 65 to a fluid transmission manifold generally referred to as 69. A transmission control lever 71 is oppositely reciprocable from a neutral position to forward and reverse displacements modes or positions dependent upon its actuation by the control rod 63 which in turn actuates rod 67 and the transmission control lever 71.

Also connected to the control rod 63 is a member 73 which is allowed to pivot about pivot 75. Plate member 77 may be in turn rigidly fastened to member 73, as is a throttle control lever 79. When the control rod 63 is moved forwardly the throttle control lever 79 also moves forwardly so as to open the throttle in response to such control rod movement. Similarly when the control rod 63 moves rearwardly, the throttle control lever 79 also moves in such direction thereby closing the choke.

Having described the transmission-throttle control apparatus, its method of operation will now be briefly discussed. When it is desired to move a forklift truck or the like in a forward direction, the first control means of footpedal 1 is depressed, and the roller member 31 of the control rod is forced along a first translational passageway 57 thereby gradually opening the throttle by means of throttle control lever 79 and gradually positioning the fluid transmission in the forward position through actuation of the transmission control lever 71.

When it is desired to move the forklift in a rearward direction, the second control means or footpedal 3 is actuated or depressed thereby forcing the control rod and its roller member 31 to generally traverse along the second translational passageway 55 thereby simultaneously and gradually changing the transmission control lever from a neutral position to a reverse displacement position and gradually opening the throttle by means of the throttle control lever 79.

When it is desired to only open the throttle by means of the throttle control lever 79, both the first and second control means 1 and 3 may be depressed thereby forcing the control rod and roller member through the third translational passageway 37.

Although preferred embodiments of this invention have been described it will readily apparent that alteration and modification can be resorted to without departing from the scope of the invention and that said alterations and modifications are intended to be included within the scope of the appended claims.

I claim:

1. A transmission-throttle control apparatus comprising:
   a swingable and rotatably moveable control rod;
   a transmission control lever oppositely reciprocable from a neutral position to forward and reverse displacement positions coupled and responsive to the movement of said control rod in first and second translational passageways;
   a throttle control lever oppositely reciprocalable to open and close a throttle responsive to the movement of said control rod in said first and second translational passageways and in a third translational passageway;
   said third translational passageway being defined by first and second wall members, said first passageway being defined by said first wall member and a fourth wall member, and said second passageway being defined by said second wall member and a third wall member, said first, second and third passageway being adjacent said control rod and adopted to allow said control rod to traverse along the path of said passageways; and
   linkage means coupling first and second control means to said control rod whereby actuation of said first control means causes said control rod to move along said first passsageway, actuation of said second control means causes said control rod to move along said second passageway and activation of both said first and second control means causes said control rod to move along third passageway.

2. The transmission-throttle control apparatus claimed in claim 1 wherein said first control means is further defined as a forward footpedal and said second control means is further defined as a reverse footpedal.

3. The transmission-throttle control apparatus claimed in claim 1 wherein said control rod is provided with a roller member adopted to roll along said walls defining said passageways.

4. The transmission-throttle control apparatus claimed in claim 1 wherein said first and second wall members are substantially parallel.

5. The transmission-throttle control apparatus claimed in claim 4 wherein said third and fourth wall members are positioned between 30° and 45° on either side of the centerline of said first and second wall members.

6. A transmission-throttle control apparatus for a forklift comprising:
   a swingable and rotatably moveable control rod provided with a roller member;
   a transmission control lever oppositely reciprocable from a neutral position to forward and reverse displacement positions coupled and responsive to the movement of said control rod in first and second translational passageways;

a throttle control lever oppositely reciprocable to open and close a throttle responsive to the movement of said control rod in said first and second translational passageways and in a third translational passageway;

said third translational passageway being defined by first and second substantially parallel wall members, said first passageway being defined by said first wall member and a fourth wall member, and said second passageway being defined by said second wall member and a third wall member, said first, second and third passageways being adjacent said control rod roller member and adopted to allow said control rod roller member to traverse said passageways; and linkage means coupling a forward footpedal and a reverse footpedal to said control rod whereby actuation of said forward footpedal causes said control rod to move along said first passageway, actuation of said reverse footpedal causes said control rod to move along said second passageway and activation of both forward and reverse footpedals causes said control rod to move along said third passageway.

* * * * *